United States Patent [19]

Eicken et al.

[11] Patent Number: 5,563,206
[45] Date of Patent: Oct. 8, 1996

[54] POLYURETHANE DISPERSIONS AND THEIR USE AS BINDERS IN STOVING LACQUERS

[75] Inventors: Ulrich Eicken, Korschenbroich; Alfred Westfechtel, Hilden; Rainer Hoefer, Duesseldorf; Roland Gruetzmacher, Wuelfrath, all of Germany

[73] Assignee: Henkel Kommanditgesellschaft auf Aktien, Duesseldorf, Germany

[21] Appl. No.: 433,485

[22] PCT Filed: Nov. 2, 1993

[86] PCT No.: PCT/EP93/03045

§ 371 Date: May 11, 1995

§ 102(e) Date: May 11, 1995

[87] PCT Pub. No.: WO94/11413

PCT Pub. Date: May 26, 1994

[30] Foreign Application Priority Data

Nov. 11, 1992 [DE] Germany .......................... 42 37 965.2

[51] Int. Cl.$^6$ ................................... C08G 18/62
[52] U.S. Cl. .................. 524/590; 524/591; 524/840; 524/873; 524/875; 525/454; 525/456; 528/71; 528/74.5; 528/75; 528/85
[58] Field of Search ..................... 524/840, 873, 524/875, 590, 591; 528/71, 74.5, 85, 75; 525/454, 456

[56] References Cited

U.S. PATENT DOCUMENTS

| | | | |
|---|---|---|---|
| 4,066,591 | 1/1978 | Scriven et al. | 428/425 |
| 5,312,865 | 5/1994 | Hoeffer et al. | 524/591 |

FOREIGN PATENT DOCUMENTS

| | | |
|---|---|---|
| 0299148 | 1/1989 | European Pat. Off. . |
| 1386762 | 12/1964 | France . |
| 1768313 | 4/1971 | Germany . |
| 3939566 | 6/1991 | Germany . |
| 3277680 | 12/1991 | Japan . |
| 0211487 | 3/1992 | Japan . |
| 4230651 | 8/1992 | Japan . |
| 9113918 | 9/1991 | WIPO . |

OTHER PUBLICATIONS

DIN 50 017, Oct., 1982; The German Institute for Testing.
DIN 50 021, Jun., 1988; The German Institute for Testing.
DIN 53 240 Dec. 1971; The German Institute for Testing.

*Primary Examiner*—Rachel Johnson
*Attorney, Agent, or Firm*—Wayne C. Jaeschke; John Daniel Wood; Daniel S. Ortiz

[57] ABSTRACT

Aqueous polyurethane dispersions prepared in several stages by reacting

A) aliphatic and/or aromatic di- and/or tri-isocyanates with

B1) polyol mixtures containing dimer diols of 25 to 100% by weight of dimer diols and 0 to 75% by weight of other hydrophobic diols and/or polyols, the equivalent ratio of OH to NCO being 1:1.1 to 1:4, and simultaneously or subsequently with B2) chain-extending agents containing two terminal NCO-reactive groups, the chain-extending agents additionally containing either artionic or cationic groups or groups convertible into anionic or cationic groups by neutralization, the equivalent ratio of NCO-reactive groups to NCO groups theoretically still present after the reaction of A) with B1) being 1:0.9 to 1:4, and then optionally reacting C) the NCO groups theoretically still present in the polyurethanes after the reaction of A) with B1) and B2) with polyols containing at least three hydroxyl groups and/or amino alcohols containing at least two hydroxyl groups in an equivalent ratio of OH+amino groups to NCO of at least 3:1, and finally dispersing the polyurethanes obtained in water, the polyurethanes obtained being at least partly neutralized before or during dispersion where the chain extending agents B2) contain as additional groups those groups which are only converted into anionic or cationic groups by neutralization, are provided. Also provided is a process for the production of aqueous polyurethane dispersions and methods of using aqueous polyurethane dispersions so prepared as stoving lacquers.

30 Claims, No Drawings

POLYURETHANE DISPERSIONS AND THEIR USE AS BINDERS IN STOVING LACQUERS

BACKGROUND OF THE INVENTION AND FIELD OF THE INVENTION

This invention relates to aqueous polyurethane dispersions prepared by reaction of diisocyanates and/or polyisocyanates with polyol mixtures containing dimer diol, chain-extending agents and optionally polyols containing at least three hydroxyl groups and subsequent dispersion in water, to a process for their production and to their use in stoving lacquers.

DISCUSSION OF RELATED ART

Aqueous polyurethane dispersions are acquiring increasing technical and economic significance because they are toxicologically and ecologically safer than polyurethanes in organic solvents. In principle, most polyurethanes may be converted into aqueous emulsions and dispersions with the assistance of external emulsifiers and intensive shear forces. Unfortunately, the stability of these systems is extremely poor. For this reason, efforts have been made to develop self-emulsifiable polyurethanes which spontaneously form stable dispersions in water without the assistance of external emulsifiers and intensive shear forces. Self-emulsifying polyurethanes of the type in question contain compounds with an anionic group, a cationic group or groups convertible into anionic and cationic groups incorporated in the polyurethane. One example of such a compound is dimethylol propionic acid which is incorporated in the polyurethane through the hydroxyl groups. After conversion into the carboxylate anion, the carboxyl group effects the dispersion of the polyurethane in water.

For example, EP-A-299 148 describes a self-emulsifying polyester urethane prepared by reaction of a hydroxyl-terminated polyester and dimethylol propionic acid with polyisocyanates. Although polyester urethanes such as these are undoubtedly self-emulsifying, they also show signs of hydrolysis because the incorporated polyester segment is susceptible to hydrolysis, so that the dispersion as a whole is destabilized. Polyether urethanes containing incorporated polyether segments, such as polyethylene glycols, polypropylene glycols, polytetrahydrofurans, etc., are less susceptible to hydrolysis. However, self-emulsifying polyurethanes showing more hydrophobic properties than the polyether urethanes mentioned are required for certain applications. Thus, relatively hydrophobic polyurethanes are required in particular in the field of coatings to ensure that the coatings reliably protect the systems to be coated against water. For this reason, there has been no shortage of attempts to provide polyurethanes containing hydrophobic segments which are self-emulsifiable in water.

Accordingly, it is proposed in DE-A-39 39 566 to terminate polyurethanes with alkoxysilane groups. Thus, according to this document, bricks which have been treated with alkoxysilane-terminated polyurethanes, optionally in the form of aqueous dispersions, show distinctly reduced permeability to water vapor. These alkoxysilane-terminated polyurethanes are obtained by a two-stage reaction. In the first stage, polyisocyanates are reacted with polyethylene glycols, which may be mixed with hydrophobic diols and/or polyols and trimethylol propane, and with dimethylol carboxylic acids to form polyurethane prepolymers still containing free isocyanate groups. The polyurethane prepolymers are then reacted with alkoxysilanes. Dimer diols, ring-opened epoxidized fats and oils, fatty acid ethanolamides, monoglycerides of fatty acids, polypropylene glycols and/or polysiloxanes are mentioned as examples of hydrophobic diols. Unfortunately, these alkoxysilane-terminated polyurethanes can only form stable aqueous dispersions up to a polyurethane solids content of 12% by weight. However, there is an increasing demand in practice for dispersions having higher polyurethane contents.

In addition, it is known from the prior art that polybutadiene polyols can be incorporated in self-emulsifying polyurethanes to obtain relatively hydrophobic polyurethanes. Unfortunately, polybutadiene diols are extremely sensitive to oxidation on account of their high percentage content of unsaturated double bonds. In addition, they have an unpleasant odor as a raw material. Although the hydrogenated representatives of the polybutadiene diols do not have any of these disadvantages, they are solid so that they have to be melted for the production of polyurethanes. In addition, aqueous polyurethane dispersions containing hydrogenated polybutadiene diols such as these show an unwanted tendency towards crystallization which reduces the stability of the dispersion.

Accordingly, the problem addressed by the present invention was to provide aqueous polyurethane dispersions containing self-emulsifying polyurethanes which would contain hydrophobic segments in the polyurethane. In addition, the polyurethanes would be substantially stable to hydrolysis and also to crystallization. Moreover, the polyurethanes would form stable dispersions, even with relatively high solids contents.

SUMMARY OF THE INVENTION

The problem stated above has been solved by aqueous polyurethane dispersions prepared in several stages by—reacting A) aliphatic and/or aromatic di- and/or triisocyanates with B1) polyol mixtures containing dimer diols of 25 to 100% by weight of dimer diols and 0 to 75% by weight of other hydrophobic diols and/or polyols, the OH/NCO equivalent ratio being 1:1.1 to 1:4, and simultaneously or subsequently with B2) chain-extending agents containing two terminal NCO-reactive groups, the chain-extending agents additionally containing either anionic or cationic groups or groups convertible into anionic or cationic groups by neutralization, the equivalent ratio of NCO-reactive groups to NCO groups theoretically still present after the reaction of A) with B1) being 1:0.9 to 1:4, and then optionally reacting C) the NCO groups theoretically still present in the polyurethanes after the reaction of A) with B1) and B2) are optionally reacted with polyols containing at least three hydroxyl groups and/or amino alcohols containing at least two hydroxyl groups in an equivalent ratio of OH+amino groups to NCO of at least 3:1, and finally dispersing the polyurethanes obtained in water, the polyurethanes obtained being at least partly neutralized before or during dispersion where the chain-extending agents B2) contain as additional groups those groups which are only converted into anionic or cationic groups by neutralization.

The polyurethane dispersions according to the invention are prepared by initially preparing the polyurethanes by reaction of diisocyanates or triisocyanates (A) with polyol mixtures (B1) containing dimer diol and chain-extending agents (B2) and optionally polyols containing at least three hydroxyl groups (C). The polyurethanes are subsequently dispersed in water in the usual way.

DETAILED DESCRIPTION OF THE INVENTION

The polyurethanes are prepared by reaction of typical aliphatic and/or aromatic diisocyanates and/or triisocyanates containing on average two or three isocyanate groups. It is preferred to use diisocyanates $Q(NCO)_2$, where Q is an aliphatic hydrocarbon radical containing 4 to 12 carbon atoms, a cycloaliphatic hydrocarbon radical containing 6 to 15 carbon atoms, an aromatic hydrocarbon radical containing 6 to 15 carbon atoms or an araliphatic hydrocarbon radical containing 7 to 15 carbon atoms. Examples of preferred diisocyanates such as these are tetramethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanatodicyclohexyl methyl, 4,4'-diisocyanatodicyclohexyl-2,2-propane, 1,4-diisocyanatobenzene, 2,4-diisocyanatotoluene, 2,6-diisocyanatotoluene, 4,4'-diisocyanatodiphenyl methane, p-xylylene diisocyanate and mixtures consisting of these compounds. Aliphatic diisocyanates, especially isophorone diisocyanate, are particularly preferred.

The triisocyanates known per se in polyurethane chemistry, which may even be modified, for example with carbodiimide groups, allophanate groups, isocyanurate groups, urethane groups and/or biuret groups, may of course also be partly used.

Up to 100% by weight of the polyol mixtures (B1) may consist of dimer diols. Alternatively, the polyol mixtures (B1) may contain at least 25% by weight, based on polyol mixture, of dimer diols. The percentage content of 25% by weight of dimer diols is necessary to ensure that the polyurethanes have the required relatively hydrophobic properties. Dimer diols are compounds known per se which may be obtained by hydrogenation of dimer fatty acids and/or esters thereof in accordance with DE-B-17 68 313. Suitable adducts are dimerization products of mono- and/or polyunsaturated fatty acids and/or esters thereof, for example dimerization products of oleic acid, linoleic acid, linolenic acid, palmitic acid, elaidic acid and/or erucic acid and/or esters thereof. Particularly preferred adducts are dimerization products of the mono- or polyunsaturated fatty acid mixtures obtained in the hydrolysis of natural fats and/or oils, for example olive oil, sunflower oil, soybean oil, cottonseed oil and/or tall oil. In addition to dimer fatty acids, varying amounts of oligomeric fatty acids and/or residues of monomeric fatty acids or esters thereof may be present in dependence upon the reaction conditions selected for the dimerizations known per se. If the dimerized fatty acids or fatty acid esters contain relatively large quantities of monomeric fatty acids or fatty acid esters, it may be useful to remove them by distillation after or before hydrogenation to form the dimer diols, preferably as fatty acid esters of lower $C_{1-4}$ alcohols. The hydrogenations of the dimerized fatty acids or their esters may be carried out in accordance with DE-B-17 68 313 in the presence of copper- and/or zinc-containing catalysts in standard continuously operated pressure hydrogenation reactors with gas circulation. Under these conditions, not only are the carboxyl groups of the fatty acids hydrogenated to hydroxyl groups, any double bonds still present in the dimerized fatty acids or esters thereof are also partly or completely hydrogenated. However, the hydrogenation may also be carried out in such a way that the double bonds remain fully intact during the hydrogenation reaction. In this case, unsaturated dimer diols are obtained, optionally in admixture with trimer triols and residual monomers. However, the hydrogenation is preferably carried out in such a way that the double bonds are at least partly or completely hydrogenated. Another possible method for the preparation of completely saturated dimer diols is to convert saturated dimer fatty acids into the corresponding saturated dimer diols by hydrogenation. Another possible method for the preparation of dimer diols comprises dimerizing unsaturated alcohols in the presence of silica/alumina catalysts and basic alkali metal compounds in accordance with International patent application WO 91/13918.

Suitable unsaturated alcohols are monounsaturated and/or polyunsaturated fatty alcohols, such as palmitoleyl, oleyl, elaidyl, linolyl, linolenyl and erucyl alcohol. This process results in the formation of unsaturated dimer diols of which the double bonds may then be partly or completely hydrogenated.

Dimer diols which have been prepared from fatty acids or esters thereof or fatty alcohols containing 18 carbon atoms are preferably used irrespective of the described processes for the production of the dimer diols. Dimer diols containing 36 carbon atoms are formed in this way. As already mentioned, the dimer diols which have been produced by the industrial processes mentioned above always contain varying amounts of trimer triols and residual monomers. In general, the percentage content of dimer diols is above 70% by weight, the rest being trimer triols and monomer alcohols. According to the invention, it is possible to use both these dimer diols and also purer dimer diols containing more than 90% by weight of dimer diol. Dimer diols containing more than 90 to 99% by weight of dimer diol are particularly preferred. Of these dimer diols, those of which the double bonds are at least partly or completely hydrogenated are preferred.

In addition to dimer diols, the polyol mixtures (B1) may contain 0 to 75% by weight of other hydrophobic diols and/or polyols, preferably other hydrophobic diols. Hydrophobic diols and/or polyols in the context of the invention are those which have a solubility in water at 20° C. of less than 300 g per liter of water. Preferred hydrophobic diols are polypropylene glycol, polytetrahydrofuran, polycaprolactone and/or hydroxyl-terminated polyesters, the hydrophobic diols having hydroxyl values according to DIN 53240 of 5 to 600 and preferably 20 to 300. The diols mentioned are commercially available products. Examples of suitable hydroxyl-terminated polyesters are polyesters based on the dicarboxylic acids adipic acid, phthalic acid, maleic acid, azelaic acid and dimer fatty acid and diols, such as ethylene glycol, propylene glycol, neopentyl glycol, hexane-1,6-diol and butane-1,4-diol. Polyol mixtures of 25 to 100% by weight of dimer diols containing 36 carbon atoms and 0 to 75% by weight of polypropylene glycol, polytetrahydrofuran, polycaprolactones and/or OH-terminated polyesters with hydroxyl values of 5 to 600 and preferably 20 to 300 are particularly preferred.

The properties of the polyurethanes may be influenced in both ranges through the polyol mixture. Thus, particularly hydrophobic polyurethanes are obtained through high percentage contents of dimer diol.

To prepare the polyurethanes, the diisocyanates and/or triisocyanates are reacted with the polyol mixture in an OH/NCO equivalent ratio of 1:1.1 to 1:4 and preferably 1:1.3 to 1:1.8. The reaction is continued until all the hydroxyl groups of the polyol mixture have reacted off so that no free hydroxyl groups are left in the reaction product. A theoretical NCO content calculated from the difference between the NCO groups used from the diisocyanates and/or triisocyanates and isocyanate groups which have theoretically reacted off with the hydroxyl groups of the polyol mixture is obtained under these circumstances. The theoretical number of NCO groups is thus a calculated number.

The reaction of the diisocyanates and/or triisocyanates with the polyol mixtures containing dimer diols may be carried out in the presence of the chain-extending agents (B2) or, alternatively, the chain-extending agents are only reacted after the reaction of the diisocyanates and/or triisocyanates with the polyol mixtures containing dimer diols. The chain-extending agents contain two terminal NCO reactive groups. NCO-reactive groups are reactive groups which contain an active hydrogen, such as for example hydroxyl groups or primary or secondary amino groups. In addition, the chain-extending agents additionally contain anionic or cationic groups or groups convertible into anionic or cationic groups by neutralization. Suitable chain-extending agents are dimethylol carboxylic acids containing 1 to 6 carbon atoms, dihydroxy containing tertiary amine nitrogen atoms, diamino compounds containing tertiary amine nitrogen atoms and reaction products of diamines with vinyl sulfonic acid or salts thereof. Examples of such chain-extending agents are dimethylol propionic acid, N-methyl diethanolamine, N-methyl diisopropanolamine, N-ethyl diethanolamine, N-ethyl diisopropanolamine, N-methyl-bis-(3-aminopropyl)amine, N-methyl-bis-(2-aminoethyl)-amine or N,N',N"-trimethyl diethylenetriamine. The compounds mentioned above are chain-extending agents additionally bearing groups which are only converted into anionic or cationic groups after neutralization. The neutralization is carried out at least partly and preferably completely. Instead of the compounds mentioned, the neutralization products, i.e. their salts, may of course be directly incorporated in the polyurethane as chain-extending agents.

Through the additional anionic and/or cationic groups, the chain-extending agents are responsible for emulsifiability in water. Accordingly, the chain-extending agents are also often referred to as so-called "inner emulsifiers". The chain-extending agents are used in such a quantity that the equivalent ratio of NCO-reactive groups of the chain-extending agents to NCO groups still theoretically present after the reaction of A) with B1) is between 1:0.9 and 1:4 and preferably between 1:1 and 1:2. As defined above, the notion of the NCO groups still theoretically present is the theoretically expected difference between isocyanate groups introduced from the diisocyanates and triisocyanates and the isocyanate groups theoretically reacted off with B1).

Depending on the equivalent ratio of NCO-reactive groups in the chain-extending agents to the NCO groups still theoretically present, the polyurethanes formed are terminated either by NCO-reactive groups or by NCO groups. The equivalent ratio is preferably selected so that the polyurethanes are terminated by NCO groups. These NCO-terminated polyurethanes may either be directly dispersed in water, in which case the isocyanate groups are converted with elimination of carbon dioxide into amine groups which can then react off with unreacted NCO groups, or the polyurethanes containing NCO groups are reacted with polyols containing at least three hydroxyl groups and/or amino alcohols containing at least two hydroxyl groups in an equivalent ratio of OH+amino group:NCO of at least 3:1. The polyurethanes obtained in this way are terminated by hydroxyl groups. Only hydroxyl-terminated polyurethanes such as these may be used as binders in stoving lacquers. Preferred polyols containing at least three hydroxyl groups are those which contain a quaternary carbon atom and which are selected from the group consisting of trimethylol propane, ditrimethylol propane, pentaerythritol, dipentaerythritol and/or amino alcohols containing at least two hydroxyl groups, preferably diethanolamine and tris-(hydroxymethyl)-methylamine. In a particularly preferred embodiment, the polyols containing at least three hydroxyl groups and/or amino alcohols containing at least two hydroxyl groups in an equivalent ratio of OH+amino groups to NCO of 3:1 to 6:1 are reacted with NCO groups still theoretically present in the polyurethanes after the reaction of A) with B1) and B2). The expression "OH+amino group" means the equivalent sum of hydroxyl and primary or secondary amino groups present. Thus, in the case of diethanolamine for example, two hydroxyl groups and one primary amino group containing two active hydrogen atoms, of which only one reacts off with isocyanates, are present, in other words a total of three NCO-reactive hydrogens are present. The equivalent sum of OH groups and amino groups is thus ⅓. According to the invention, therefore, at least 1 mole of diethanolamine should be used for every NCO group.

Irrespective of whether the polyurethanes are terminated by reactive groups, they are finally dispersed in water in the usual way. The polyurethanes obtained should be at least partly and preferably completely neutralized before or at the latest during dispersion in cases where the chain-extending agents B2) contain additional groups which have first to be converted into anionic or cationic groups by neutralization. Chain-extending agents such as these have already been described. Acids or bases are used for neutralization according to the character of the group of the chain-extending agent. Particularly suitable acids are the inorganic acids, such as hydrochloric acid, sulfuric acid, carbonic acid, or even organic acids, such as acetic acid, formic acid and lactic acid. Suitable bases are, of course, the alkali metal hydroxides and also organic compounds containing a tertiary amine, such as dimethyl ethanolamine, N-methyl morpholine or triethylamine.

In addition to water, the aqueous polyurethane dispersions may also contain a polar organic solvent, such as N-methyl pyrrolidone, methyl ethyl ketone or acetone. However, it is now of toxicological and ecological advantage to dispense with these organic solvents.

The aqueous polyurethane dispersions according to the invention are prepared in accordance with the process claim by reacting the aliphatic and/or aromatic diisocyanates and/or triisocyanates with polyol mixtures containing dimer diols and chain-extending agents terminated by two NCO-reactive groups. The reaction with the chain-extending agents may be carried out at the same time as or after the reaction with the polyol mixture containing dimer diols. The so-called one-pot reaction is preferred. In this reaction, both the polyol mixtures containing dimer diols and the chain-extending agents are reacted together with the diisocyanates and/or triisocyanates. It is useful in this regard to add the diisocyanates and/or triisocyanates to the polyol mixtures containing dimer diols and given chain-extending agents. The reaction temperature is generally in the range from 20° to 160° C. and preferably in the range from 50° to 120° C. The reaction may be carried out in the presence of an organic water-miscible solvent inert to NCO groups. If desired, the solvent may then be removed by distillation after conversion of the polyurethanes into the aqueous phase. However, the polyurethane is advantageously produced without a solvent.

The reaction parameters were mentioned in the foregoing. Thus, in one embodiment of the invention, NCO-terminated polyurethanes may be prepared in this way and, if desired, may subsequently be reacted with polyols containing at least three hydroxyl groups and/or amino alcohols containing at least two hydroxyl groups. This reaction with the polyols containing at least three hydroxyl groups is preferably carried out at temperatures of 50° to 120° C.

Conversion of the polyurethanes into the aqueous phase generally takes place at 20° to 100° C. Water is used in such a quantity that a 10 to 50% by weight and preferably 20 to 50% by weight dispersion of the polyurethanes is obtained. At least partial neutralization is carried out before or at the latest during dispersion of the polyurethanes in water in cases where the chain-extending agents B2) contain additional groups which have first to be converted into anionic or cationic groups by neutralization. Neutralization takes place at the same temperatures as dispersion.

The present invention relates to the use of aqueous polyurethane dispersions prepared in several stages by reacting A) aliphatic and/or aromatic diisocyanates and/or triisocyanates with B1) polyol mixtures containing dimer diols of 25 to 100% by weight of dimer diols and 0 to 75% by weight of other hydrophobic diols and/or polyols in an OH:NCO equivalent ratio of 1:1.1 to 1:4 and simultaneously or subsequently with B2) chain-extending agents containing two terminal NCO-reactive groups, the chain-extending agents additionally containing either anionic or cationic groups or groups convertible into anionic or cationic groups by neutralization, in an equivalent ratio of NCO-reactive groups to NCO groups still theoretically present after the reaction of A) with B1) of 1:1.05 to 1:4 and C) reacting the polyurethanes containing NCO groups still theoretically present after the reaction of A) with B1) and B2) with polyols containing at least three hydroxyl groups and/or amino alcohols containing at least two hydroxyl groups in an equivalent ratio of OH+amino groups to NCO of at least 3:1 and subsequently dispersing the polyurethanes obtained in water, the reaction product being at least partly neutralized before or during dispersion of the polyurethanes in cases where the chain-extending agents contain as additional groups those groups which first have to be converted into anionic or cationic groups by neutralization, as binders for stoving lacquers.

The chain-extending agents are used in an equivalent ratio of NCO-reactive groups to NCO groups still theoretically present after the reaction of A) with B1) of 1:1.05 to 1:4 so that the polyurethanes obtained are always terminated by free NCO groups. These NCO-terminated polyurethanes are then reacted with the polyols containing at least three hydroxyl groups and/or amino alcohols containing at least two hydroxyl groups in the equivalent ratio already mentioned, so that polyurethanes containing free hydroxyl groups are formed. These hydroxyl-containing polyurethanes are dispersed and optionally neutralized as described above. Corresponding aqueous dispersions of hydroxyl-containing polyurethanes are suitable as binders in stoving lacquers. In the most simple case, a stoving lacquer may be prepared by adding crosslinking agents to the aqueous dispersion of hydroxyl-containing polyurethanes. Suitable crosslinking agents are phenol/formaldehyde condensates, urea/formaldehyde condensates, such as a urea/formaldehyde resin containing methylol groups, and melamine/formaldehyde condensates, such as a melamine/formaldehyde condensate containing methylol groups. Melamine/formaldehyde condensates containing methylol groups are particularly preferred crosslinking agents for stoving lacquers.

Crosslinking itself is achieved by stoving the binders with the crosslinking agents. If desired, binder mixtures of aqueous polyurethane dispersions and typical binders may also be used. Typical known binders are nitrocellulose, polyacrylates, polyester resins, epoxy resins, modified alkyd resins, polyurethanes or chlorinated rubber.

If desired, the aqueous polyurethane dispersions according to the invention may be used as binders for stoving lacquers which, in addition to crosslinking agents, contain typical additional constituents, such as plasticizers, pigments, siccatives and other auxiliaries and additives. The quantities of other constituents lie within the ranges typical of stoving lacquers.

Binders variable within wide limits may be produced with the aqueous dispersions of hydroxyl-containing polyurethanes according to the invention, so that widely variable properties can also be imparted to the stoving lacquers produced from them. Thus, it is readily possible with the polyurethanes according to the invention to produce stoving lacquers having highly elastic and hard film properties or even very soft film properties. This range of variation may readily be achieved through the other hydrophobic diols and polyols present in the polyol mixture containing dimer diol. Thus, the use of hydroxyl-terminated polyesters as a hydrophobic diol often leads to hard films. Polyurethanes which, by contrast, have been produced from dimer diols and polytetrahydrofurans tend more to show soft and elastic properties. One feature common to all stoving lacquers is that, where the aqueous polyurethane dispersions according to the invention are used, they may be stoved at temperatures of only around 130° C., the lacquer films obtained showing very good properties in the salt spray test and the condensation test.

EXAMPLES

A) Preparation of the aqueous PUR dispersions

The NCO content was determined by reaction of the product to be tested with an excess of n-butylamine and back-titration of the unreacted butylamine with hydrochloric acid. The NCO content is determined from the consumption of n-butylamine.

A1)

223.1 g (0.4 mole) of dimer diol (characteristic data: hydroxyl value according to DIN 53240 OHV=201; saponification value according to DIN 53401 SV=2.1; iodine value according to DGF CV, 11b IV=52; composition according to GPC: approximately 95% by weight of dimer diol containing 36 carbon atoms, approximately 2% by weight of trimer triol containing 54 carbon atoms, rest monomer), prepared by hydrogenation of distilled esters of a dimerized tall oil fatty acid, and 27 g (0.2 mole) of dimethylol propionic acid and 90.8 g of the solvent, N-methyl pyrrolidone, were introduced into a three-necked flask equipped with a stirrer, internal thermometer, dropping funnel and reflux condenser. The components were dissolved while stirring at 75° C. 155.4 g (0.7 mole) of isophorone diisocyanate were added dropwise to the solution and the reaction mixture was heated to 90° C. After an NCO content of 1.62% by weight had been reached, 29.5 g (0.22 mole) of trimethylol propane were added and the mixture was kept at 100° C. until an NCO content of 0.09% by weight had been reached.

17.9 g of dimethyl ethanolamine were added for neutralization. 543.7 g of an 83.3% by weight solution in N-methyl pyrrolidone were obtained.

500 g of this solution were dispersed while stirring with 1583 g of deionized water. A viscous fine-particle dispersion with a polyurethane solids content of 25% by weight was obtained.

A2)

223.1 g of dimer diol from Example A1), 27 g of dimethylol propionic acid and 155.4 g of isophorone diisocyanate were reacted in 90.8 g of N-methyl pyrrolidone as in Example A1) to an NCO content of 1.66% by weight. 20.2 g of N-methyl morpholine were then added for neutralization. A clear melt was obtained. 24.2 g of tris-(hydroxymethyl)-methylamine dissolved in 660 g of deionized water were added to the stirred melt to react off the remaining NCO groups. After addition of another 750 g of deionized water, a viscous dispersion with a PUR solids content of 30% by weight was obtained.

A3)

199.3 g (0.36 mole) of dimer diol from Example A1), 208.2 g (0.2 mole) of polytetrahydrofuran (OHV=107.8), 35.2 g (0.26 mole) of dimethylol propionic acid and 40 g of the solvent, N-methyl pyrrolidone, were introduced into a three-necked flask in accordance with Example A1). After the components had been dissolved at 75° C., 218.6 g (0.98 mole) of isophorone diisocyanate were added. An NCO content of 1.71% by weight was reached after 7 hours at 80° C.

44 g (0.33 mole) of trimethylol propane dissolved in 100 g of methyl ethyl ketone were added to the reaction mixture, followed by stirring for another 4 hours until the NCO content was less than 0.01% by weight. A solution having a PUR solids content of 83.4% by weight was obtained.

11.0 g of dimethyl ethanolamine were added to 400 g of this solution for neutralization, followed by stirring with 573 g of deionized water. An opaque dispersion with a PUR solids content of 35% by weight was obtained.

A4)

The procedure was as in Example A3), except that 6.1 g of dimethyl ethanolamine as opposed to 11.0 g were used for neutralization and the mixture was stirred with only 565 g of deionized water instead of 573 g. A milky viscous dispersion with a PUR solids content of 35% by weight was obtained.

A5)

199.3 g (0.36 mole) of dimer diol from Example A1), 161.4 g (0.2 mole) of a polyester with an OHV of 139, prepared from 1 mole of phthalic anhydride and 2 moles of hisphenol A propoxylated with 2 moles of propylene oxide, 35.2 g (0.26 mole) of dimethylol propionic acid and 40 g of N-methyl pyrrolidone (solvent) were introduced into a three-necked flask in accordance with Example A1). After the substances had dissolved at 35° C., 218.6 g (0.98 mole) of isophorone diisocyanate were added dropwise. After 8 hours, an NCO content of 1.63% by weight had been reached. 44.0 g (0.33 mole) of trimethylol propane dissolved in 200 g of methyl ethyl ketone were then added, followed by stirring for another 3 hours at 50° C. until no more NCO could be detected. 15.5 g of dimethyl ethanolamine were then added for neutralization. 914 g of a 73.7% by weight solution of PUR were obtained.

671 g of hot deionized water were added with stirring to 400 g of this solution and the methyl ethyl ketone was removed in vacuo. A viscous fine-particle emulsion with a PUR solids content of 30% by weight was obtained.

A6)

250 g (0.45 mole) of dimer diol from Example A1), 250 g (0.31 mole) of a polyester with an OHV of 140 prepared from 1 mole of isophthalic acid, 1.5 moles of adipic acid, 1 mole of hexane-1,6-diol, 1 mole of neopentyl glycol and 1 mole of diethylene glycol, 44 g (0.3 mole) of dimethylol propionic acid, 50 g of N-methyl pyrrolidone and 273.1 g (1.2 mole) of isophorone diisocyanate were introduced into a three-necked flask and heated with stirring to 80° C. in accordance with Example 1. After an NCO content of 1.35% by weight had been reached, 22 g of N-methyl morpholine were added and a fine-particle dispersion with a solids content of 40% by weight was subsequently obtained by addition of 1258 g of deionized water.

A7)

250 g (0.45 mole) of dimer diol from Example 1, 250 g (0.15 mole) of a polyester with an OHV of 69, prepared from 1 mole of dimer fatty acid and 2 moles of dimer diol from Example 1, 44 g (0.3 mole) of dimethylol propionic acid, 50 g of N-methyl pyrrolidone and 248.8 g (1.1 mole) of isophorone diisocyanate were introduced into a three-necked flask in accordance Example A1) and, after the addition of 100 g of methyl ethyl ketone, were heated with stirring to 80° C. After an NCO content of 1.8% by weight NCO had been reached, 22.0 g of N-methyl morpholine were added and a fine-particle dispersion with a solids content of 30% by weight was subsequently obtained by addition of 1048 g of deionized water. The methyl ethyl ketone was then removed.

B) Production of clear lacquers

Clear lacquers were produced from the PUR dispersions according to the invention by addition of 7.1 g or 10.3 g of Cymel 370® (88% by weight solution of a partly methylated melamine/formaldehyde resin, a product of Cyanamid) or Cymel 373® (85% by weight solution of a partly methylated melamine/formaldehyde resin, a product of Cyanamid). Where the PUR dispersions of Examples A1) to A5) had only been partly neutralized, dimethyl ethanolamine (DMEA) and optionally deionized water were also added. The compositions of the clear lacquers are shown in Table 1. The figures represent grams based on 100 g of PUR dispersion according to Examples A. The clear lacquers were knife-coated onto deep-drawn plates in dry film thicknesses of 35μ and stoved for 20 minutes at 130° C. The stoved films were tested for hardness, elasticity and adhesion. Hardness was determined after 24 hours as König pendulum hardness (DIN 53157) and is expressed in seconds. Elasticity was determined by the Erichsen indentation method according to DIN ISO 1520. Values above 12 indicate that the lacquer is extremely flexible because it only cracks when the plate cracks in the test. Adhesion was tested by the crosshatch method according to DIN 53151. The crosshatching was then additionally covered with an adhesive tape which was then peeled off. The more lacquer particles which adhere to the adhesive tape, the poorer the adhesion of the lacquer. The results of this test are evaluated on a scale of 0 to 4, high scores signifying poor adhesion.

The results of these tests are also set out in Table 1.

TABLE 1

| | | | Clear lacquers and test results | | | | | |
|---|---|---|---|---|---|---|---|---|
| Lacquer | PUR dispersion | Cymel 370® | Cymel 373® | DMEA | Water | Pendulum hardness | Erichsen indentation | Crosshatch |
| B1 | A1 | 7.1 | — | 0.5 | 12 | 97 | >12* | 0 |
| B2 | A2 | 7.1 | — | 0.5 | 12 | 100 | >12* | 0 |

TABLE 1-continued

| | | Clear lacquers and test results | | | | | | |
|---|---|---|---|---|---|---|---|---|
| Lacquer | PUR dispersion | Cymel 370® | Cymel 373® | DMEA | Water | Pendulum hardness | Erichsen indentation | Crosshatch |
| B3 | A3 | 7.1 | — | — | — | 40 | >12* | 0 |
| B4 | A5 | — | 10.3 | 0.6 | 13.8 | 196 | 1.6 | 4 |

*Plate failure

C) Production of white lacquers

White lacquers were produced from the PUR dispersions according to A1) to A5) by grinding the dispersions in a bead mill with titanium dioxide (Kronos 2310®), Cymel 370®, a product of Cyanamid, dimethyl ethanolamine (DMEA) and water.

The compositions of the white lacquers are shown in Table 2 (quantities by weight in g)

TABLE 2

| | | White lacquers | | | |
|---|---|---|---|---|---|
| Lacquer | PUR dispersion | Quantity of PUR dispersion | TiO$_2$ | Cymel 370® | DMEA | Water |
| C1 | A1 | 57.2 | 10.0 | 5.4 | 0.2 | 3.0 |
| C2 | A4 | 61.0 | 15.0 | 8.1 | 0.4 | 10.0 |
| C3 | A5 | 47.7 | 10.0 | 5.4 | 0.2 | 10.0 |

In the same way as the clear lacquers, the white lacquers were knife-coated onto deep-drawn plates and stoved.

In addition to pendulum hardness, crosshatching with adhesive tape and Erichsen indentation, the white lacquers were also tested for gloss in % at an angle of 60°, resistance to condensation (DIN SK 50017) and rust creepage in the salt spray test (DIN 50021) after 200 hours. The results are set out in Table 3.

A white lacquer containing a commercial polyurethane dispersion with no dimer diol was used for comparison. The white lacquer had been obtained by grinding of the following ingredients in a bead mill:

114.7 g Neo Rez R961®; a polyurethane dispersion of ICI with a solids content of 34% by weight
34.0 g TiO$_2$
14.8 g Cymel 370®
0.4 g DMEA
27.0 g water

TABLE 3

| | Test results of the white lacquers | | | | | |
|---|---|---|---|---|---|---|
| Lacquer | Pendulum hardness | Crosshatch | Erichsen Indentation | Gloss | Rust creepage in mm | Resistance to condensation in hours |
| C1 | 102 | 0 | 9.7 | 73.4 | 1 | >400 |
| C2 | 31 | 0 | >12 | 84.1 | 4–5 | >400 |
| C3 | 172 | 1 | 1.5 | 89.8 | 1 | >400 |
| Comp. | 130 | 1 | 8.2 | 72.5 | 4–5 | Bubble formation after 96 hours |

We claim:

1. A process for the production of aqueous polyurethane dispersions, said process comprising reacting:

A) an isocyanate selected from the group consisting of aliphatic di-isocyanates, aliphatic tri-isocyanates, aromatic di-isocyanates, and aromatic tri-isocyanates with B1) a polyol mixture containing 25 to 100% by weight of a dimer diol and 0 to 75% by weight of other hydrophobic diols or polyols, the equivalent ratio of OH to NCO being 1:1.1 to 1:4, and B2) chain-extending agents containing two terminal NCO-reactive groups, the chain-extending agents additionally containing either anionic or cationic groups or groups convertible into anionic or cationic groups by neutralization, the equivalent ratio of NCO-reactive groups of the chain extending agent to NCO groups theoretically still present after the reaction of A) with B1) being 1:0.9 to 1:4, and, finally dispersing in water the product of said reacting, said product being at least partly neutralized before or during said dispersing and wherein the chain extending agents B2 ) contain as additional groups those groups which are only converted into anionic or cationic groups by neutralization.

2. The process as claimed in claim 1 wherein said isocyanate is a di-isocyanate.

3. The process as claimed in claim 1 wherein said isocyanate is an aliphatic di-isocyanate.

4. The process as claimed in claim 1 wherein said isocyanate is isophorone di-isocyanate.

5. The process as claimed in claim 1 wherein said polyol mixture containing a dimer diol comprises: 25 to 100% by weight of a dimer diol containing 36 carbon atoms and 0 to 75% by weight of a member selected from the group consisting of polypropylene glycol, polytetrahydrofuran, polycaprolactones and OH-terminated polyesters hydroxyl values of 5 to 600.

6. The process as claimed in claim 1 wherein said polyol mixture containing a dimer diol comprises: 25 to 100% by weight of a dimer diol containing 36 carbon atoms and 0 to 75% by weight of a member selected from the group consisting of polypropylene glycol, polytetrahydrofuran, polycaprolactones and OH-terminated polyesters with hydroxyl values of 20 to 300.

7. The process as claimed in claim 1 wherein the OH/NCO equivalent ratio said reacting of said isocyanate with said polyol mixture is between 1:1.3 and 1:1.8.

8. The process as claimed in claim 1 wherein said chain-extending agents are selected from the group consisting of dimethylol carboxylic acids containing 1 to 6 carbon atoms, dihydroxy compounds containing tertiary amine nitrogen atoms, diamino compounds containing tertiary amine nitrogen atoms and reaction products of diamines with vinyl sulfonic acid or salts thereof.

9. The process as claimed in claim 1 wherein the equivalent ratio of the NCO-reactive groups of the chain-extending agent to NCO groups still theoretically present after the reaction of A) with B1)is between 1:1 and 1:2.

10. The process as claimed in claim 1 further comprising reacting the NCO groups theoretically still present in the product of said reacting of A) with B1) and B2) with C) a member selected from the group consisting of i) polyols containing at least three hydroxyl groups and ii) amino alcohols containing at least two hydroxyl groups, in an equivalent ratio of total OH and amino groups to NCO of at least 3:1.

11. The process as claimed in claim 10 wherein said polyol containing at least three hydroxyl groups is selected from the group consisting of trimethylol propane, ditrimethylol propane, pentaerythritol and dipentaerythritol and said amino alcohol containing at least two hydroxyl groups is selected from the group consisting of diethanolamine and tris(hydroxymethyl)methylamine.

12. The process as claimed in claim 10 wherein the NCO groups theoretically still present in the polyurethane after the reaction of A) with B1 ) and B2) are reacted with said member selected from the group consisting of polyols containing at least three hydroxyl groups and amino alcohols containing at least two hydroxyl groups in an equivalent ratio of total OH and amino groups to NCO of 3:1 to 6:1.

13. The aqueous polyurethane dispersions produced by the process of claim 1.

14. The stoving lacquer prepared by the process of adding a crosslinking agent to an aqueous polyurethane dispersion of claim 13.

15. The stoving lacquer as claimed in claim 14 wherein said crosslinking agent is selected from the group consisting of phenol/formaldehyde condensates, urea/formaldehyde condensates, and melamine/formaldehyde condensates.

16. The process for the production of aqueous polyurethane dispersions, said process comprising reacting:

A) an isocyanate selected from the group consisting of aliphatic di-isocyanates, aliphatic tri-isocyanates, aromatic di-isocyanates, and aromatic tri-isocyanates with B1) a polyol mixture containing 25 to 100% by weight of a dimer diol and 0 to 75% by weight of other hydrophobic diols or polyols, the equivalent ratio of OH to NCO being 1:1.1 to 1:4, and subsequently reacting the product of said reacting of A) with B1) with B2) chain-extending agents containing two terminal NCO-reactive groups, the chain-extending agents additionally containing either anionic or cationic groups or groups convertible into anionic or cationic groups by neutralization, the equivalent ratio of NCO-reactive groups to NCO groups theoretically still present after the reaction of A) with B1) being 1:0.9 to 1:4, and, finally dispersing in water the product of said reacting, said product being at least partly neutralized before or during said dispersing and wherein the chain extending agents B2 ) contain as additional groups those groups which are only converted into artionic or cationic groups by neutralization.

17. A process as claimed in claim 16 wherein said isocyanate is a di-isocyanate.

18. The process as claimed in claim 17 wherein said isocyanate is an aliphatic diisocyanate.

19. The process as claimed in claim 16 wherein said isocyanate is isophorone di-isocyanate.

20. The process as claimed in claim 16 wherein said polyol mixture containing a dimer diol comprises: 25 to 100% by weight of a dimer diol containing 36 carbon atoms and 0 to 75% by weight of a member selected from the group consisting of polypropylene glycol, polytetrahydrofuran, polycaprolactones, and OH-terminated polyesters with hydroxyl values of 5 to 600.

21. The process as claimed in claim 16 wherein said polyol mixture containing a dimer diol comprises: 25 to 100% by weight of a dimer diol containing 36 carbon atoms and 0 to 75% by weight of a member selected from the group consisting of polypropylene glycol, polytetrahydrofuran, polycaprolactones, and OH-terminated polyesters with hydroxyl values of 20 to 300.

22. The process as claimed in claim 16 wherein the OH/NCO equivalent ratio said reacting of said isocyanate with said polyol mixture is between 1:1.3 and 1:1.8.

23. The process as claimed in claim 16 wherein said chain-extending agents are selected from the group consisting of dimethylol carboxylic acids containing 1 to 6 carbon atoms, dihydroxy compounds containing tertiary amine nitrogen atoms, diamino compounds containing tertiary amine nitrogen atoms and reaction products of diamines with vinyl sulfonic acid or salts thereof.

24. The process as claimed in claim 16 wherein the equivalent ratio of the NCO-reactive groups of the chain-extending agent to NCO groups still theoretically present after the reaction of A) with B 1 ) is between 1:1 and 1:2.

25. The process as claimed in claim 16 further comprising reacting the NCO groups theoretically still present in the product of said reacting of A) with B1) and B2) with C) a member selected from the group consisting of i) polyols containing at least three hydroxyl groups and ii) amino alcohols containing at least two hydroxyl groups, in an equivalent ratio of total OH and amino groups to NCO of at least 3:1.

26. The process as claimed in claim 25 wherein said polyols containing at least three hydroxyl groups are selected from the group consisting of trimethylol propane, ditrimethylol propane, pentaerythritol and dipentaerythritol and said amino alcohols containing at least two hydroxyl groups are selected from the group consisting of diethanolamine and tris(hydroxymethyl)methylamine.

27. Thè process as claimed in claim 25 wherein the NCO groups theoretically still present in the polyurethane after the reaction of A) with B1 ) and B2) are reacted with said member selected from the group consisting of polyols containing at least three hydroxyl groups and amino alcohols containing at least two hydroxyl groups in an equivalent ratio of total OH and amino groups to NCO of 3:1 to 6:1.

28. The aqueous polyurethane dispersions produced by the process of claim 25.

29. The stoving lacquer prepared by the process of adding a crosslinking agent to an aqueous polyurethane dispersion of claim 28.

30. The stoving lacquer as claimed in claim 29 wherein said crosslinking agent is selected from the group consisting of phenol/formaldehyde condensates, urea/formaldehyde condensates, and melamine/formaldehyde condensates.

* * * * *